(12) United States Patent
Adams et al.

(10) Patent No.: US 10,287,099 B2
(45) Date of Patent: May 14, 2019

(54) SYSTEM AND METHOD FOR RECONDITIONING RAILCAR SIDE FRAMES

(71) Applicant: TTX Company

(72) Inventors: Ronald G. Adams, Evans, GA (US); Sayeedur Rahman, North Augusta, SC (US); Michael Lazaro, North Augusta, SC (US)

(73) Assignee: TTX Company, Chicago, IL (US)

( * ) Notice: Subject to any disclaimer, the term of this patent is extended or adjusted under 35 U.S.C. 154(b) by 152 days.

(21) Appl. No.: 15/081,015

(22) Filed: Mar. 25, 2016

(65) Prior Publication Data

US 2017/0275099 A1    Sep. 28, 2017

(51) Int. Cl.
| | |
|---|---|
| *B65G 17/32* | (2006.01) |
| *B23P 6/00* | (2006.01) |
| *B61F 1/10* | (2006.01) |
| *B65G 17/20* | (2006.01) |
| *B60S 5/00* | (2006.01) |
| *B61F 5/00* | (2006.01) |
| *B66C 1/10* | (2006.01) |
| *B66F 7/22* | (2006.01) |

(52) U.S. Cl.
CPC ............... *B65G 17/32* (2013.01); *B23P 6/00* (2013.01); *B60S 5/00* (2013.01); *B61F 1/10* (2013.01); *B61F 5/00* (2013.01); *B65G 17/20* (2013.01); *B66C 1/10* (2013.01); *B66F 7/22* (2013.01)

(58) Field of Classification Search
CPC .................................................. B62D 65/18
USPC ..................... 198/346.3, 346.2, 465.4, 678.1
See application file for complete search history.

(56) References Cited

U.S. PATENT DOCUMENTS

| | | | | |
|---|---|---|---|---|
| 5,186,304 A | * | 2/1993 | Kaczmarek | ............ B62D 65/02 |
| | | | | 198/346.1 |
| 6,732,852 B2 | * | 5/2004 | Kilabards | ................ B23Q 1/03 |
| | | | | 198/465.1 |

FOREIGN PATENT DOCUMENTS

| | | |
|---|---|---|
| CN | 1725014 A | 1/2006 |
| CN | 201079956 Y | 7/2008 |
| CN | 102430906 B | 8/2013 |
| CN | 104259811 A | 1/2015 |
| JP | 2006036387 A | 2/2006 |
| RU | 2383457 C2 | 3/2010 |

OTHER PUBLICATIONS

Jul. 3, 2017 —(WO) International Search Report and Written Opinion—App. PCT/US2017/024064.

* cited by examiner

*Primary Examiner* — Gene O Crawford
*Assistant Examiner* — Lester Rushin, III
(74) *Attorney, Agent, or Firm* — Banner & Witcoff, Ltd.

(57) ABSTRACT

A system and method for reconditioning railcar side frames including an overhead conveyer system, a railcar side frame holder, where the side frame is secured in the side frame holder, where the side frame holder is movably engaged with the overhead conveyer. The side frame and side frame holder are moved along the conveyer to a plurality of stations to perform operations such as welding and grinding. The side frame holder enables the side frame to be rotated 360 degrees while secured in the side frame holder. The side frame holder includes a fixed side arm, a movable side arm, and a pair of frame guides.

12 Claims, 13 Drawing Sheets

SYSTEM AND METHOD FOR RECONDITIONING RAILCAR SIDE FRAMES

TECHNICAL FIELD

Aspects of the disclosure generally relate to railcar side frames and equipment for handling railcar side frames. In particular, various aspects of the disclosure relate to apparatuses, systems, and methods for reconditioning railcar side frames.

BACKGROUND

Railway cars typically consist of a railcar that rests upon a pair of truck assemblies. The truck assemblies include a pair of side frames and wheelsets connected together via a bolster and damping system. The car rests upon the center bowl of the bolster, which acts as a point of rotation for the truck system. The car body movements are reacted through the springs and friction wedge dampers, which connect the bolster and side frames. The side frames include pedestals that each define a jaw into which a wheel assembly of a wheel set is positioned using a roller bearing adapter.

Over time the side frames may become damaged or worn to a point they must be replaced. Most side frames are formed via various casting techniques, however as an alternative to producing new side frames, some worn side frames may be reconditioned to bring the side frames back into the appropriate specification requirements to allow the reconditioned side frames to be reinstalled onto the truck assemblies.

Since side frames come in a multitude of sizes, the reconditioning process is a labor intensive process with an operator spending hours reconditioning each side frame individually. A method and system to accommodate the variety of sizes of side frames and enable the reconditioning process to be done more effectively is desired.

BRIEF SUMMARY

An object of the invention is to provide a method of reconditioning the multiple varieties of side frames in a more timely and cost effective manner.

Aspects of this disclosure may relate to a structure for holding a railroad side frame comprising a horizontal base, a first side arm extending downward from the horizontal base, the first side arm fixed to the horizontal base, a second side arm extending downward from the horizontal base, the second side arm movably engaged with the horizontal base, a first frame guide and a second frame guide, each frame guide comprising a pair of opposing surfaces spaced a fixed distance apart and a mounting surface adjoining the opposing surfaces. The fixed distance of the opposing surfaces may be within a range of 6 inches to 7 inches. Additionally, the first frame guide may be rotatably engaged with the first side arm and the second frame guide may be rotatably engaged with the second side arm. Each opposing surface may have a plurality of holes through each of the opposing surfaces, where the plurality of holes on the opposing surfaces of the first frame guide are coaxial and the plurality of holes on the opposing surfaces of the second frame guide are coaxial. Each frame guide further comprises a pin extending from the mounting surface and located between the opposing surfaces.

Other aspects of this disclosure may relate to the structure for holding a railroad side frame further comprising a first shaft connecting the first frame guide to the fixed side arm and a second shaft connecting the second frame guide to the movable side arm, where the first shaft may be connected to the first frame guide using a hinge pin and where the second shaft may be connected to the second frame guide using a hinge pin. In addition, the first shaft may be connected to a gearbox. Also, the horizontal base may comprise a mounting bracket to connect to an overhead conveyer and the side frame holder may have a container connected to the fixed side arm.

Another aspect of this disclosure may relate to a method to recondition a side frame of a railcar comprising: installing a side frame into a side frame holder, engaging the side frame holder with a conveyer system, moving side frame holder via the conveyer system to a plurality of stations. The plurality of stations may comprise: a preparatory station; a pedestal station and a column station. Additionally, the method may further comprise grinding the side frame at the preparatory station, grinding and welding the side frame at the pedestal station, and grinding and welding the side frame at the column station. Each station may be physically spaced a distance apart sufficient for a structure holding a side frame to be positioned while waiting for the next station to become available. The method may further comprise the side frame holder comprising a first frame guide and a second frame guide; and wherein the side frame is positioned between the first and second frame guides.

Still another aspect of this disclosure may relate to a system for reconditioning a side frame of a railcar comprising an overhead conveyer, a side frame holder, where a side frame is secured in the side frame holder; and where the side frame holder is movably engaged with the overhead conveyer. The overhead conveyer may form a continuous loop and the side frame may be able to be rotated 360 degrees while secured in the side frame holder. Lastly, the side frame holder may comprise a fixed side arm and a movable side arm; a pair of frame guides; each frame guide having pair of opposing surfaces, where the side frame is secured within the frame guides.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

Figure 1:
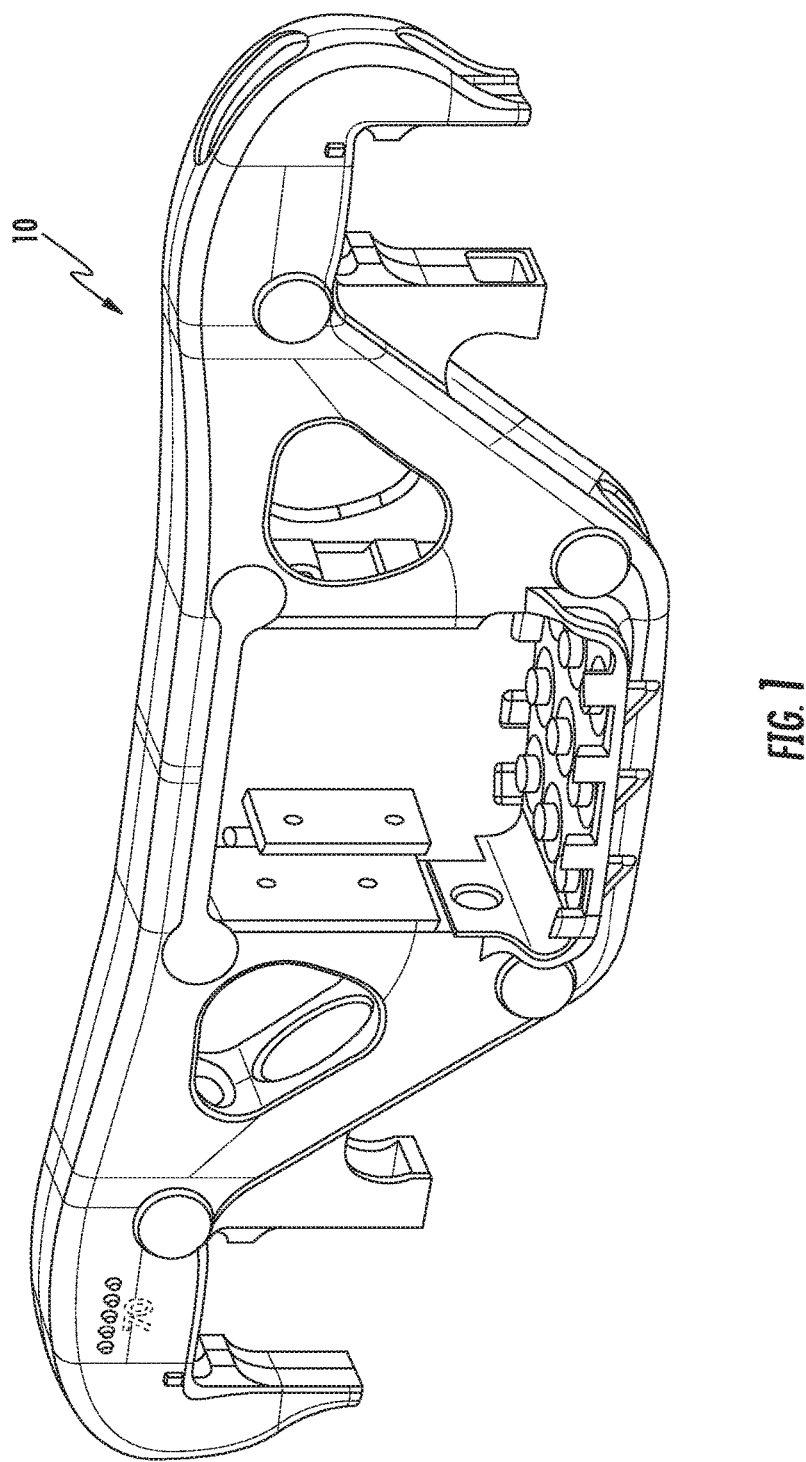
FIG. 1 depicts a perspective view of an exemplary railcar side frame.

Further, it is to be understood that the drawings may represent the scale of different component of one single embodiment; however, the disclosed embodiments are not limited to that particular scale.

DETAILED DESCRIPTION

While this invention is susceptible of embodiments in many different forms, there are shown in the drawings and will herein be described in detail exemplary embodiments of the invention with the understanding that the present disclosure is to be considered as an exemplification of the principles of the invention and is not intended to limit the broad aspects of the invention to the embodiments illustrated. It is to be understood that other embodiments may be utilized and structural and functional modifications may be made, without departing from the scope and spirit of the present disclosure.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Substantially perpendicular" means that two elements are oriented at an angle of 90 degrees or within +/−4 percent of 90 degrees.

"Substantially parallel" means that two elements are oriented at an angle of 0 degrees or within +/−4 percent of 0 degrees.

In general, aspects of this invention relate to a process for reconditioning the side frames of railcars. The process may help to reduce the cycle time required for reconditioning a side frame 10 by providing an efficient flow on the factory floor using a conveyer system 102. As part of the process, a side frame holding structure 200, also referred to as a side frame holder, may be used to movably connect to the conveyer system 102 and effectively constrain the side frame 10 while allowing an operator to perform all of the necessary operations to recondition the side frame to the requirements.

The various figures in this application illustrate examples of portable lights according to this disclosure. When the same reference number appears in more than one drawing, that reference number is used consistently in this specification and the drawings to refer to the same or similar parts throughout.

FIG. 1 shows a rail car side frame 10. Rail car side frames are typically made of steel castings and may have a variety of sizes. Different sized rail cars have different utilization rates and this also can add to the difficulty and labor intensity of reconditioning side frames. Because of the size variation, side frames 10 may have a weight that ranges between about 700 pounds to about 1100 pounds. This size and weight variation may make the reconditioning process more difficult and labor intensive. The reconditioning process must be done in accordance with the requirements of the American Association of Railroads (AAR) Specification M-214, which sets the standards for reconditioning the side frames and which is incorporated by reference herein. The reconditioning process may require the side frame to have any assembled components removed, and have material added or material removed in certain areas to meet the dimensional requirements of each specific side frame 10.

Figure 2:
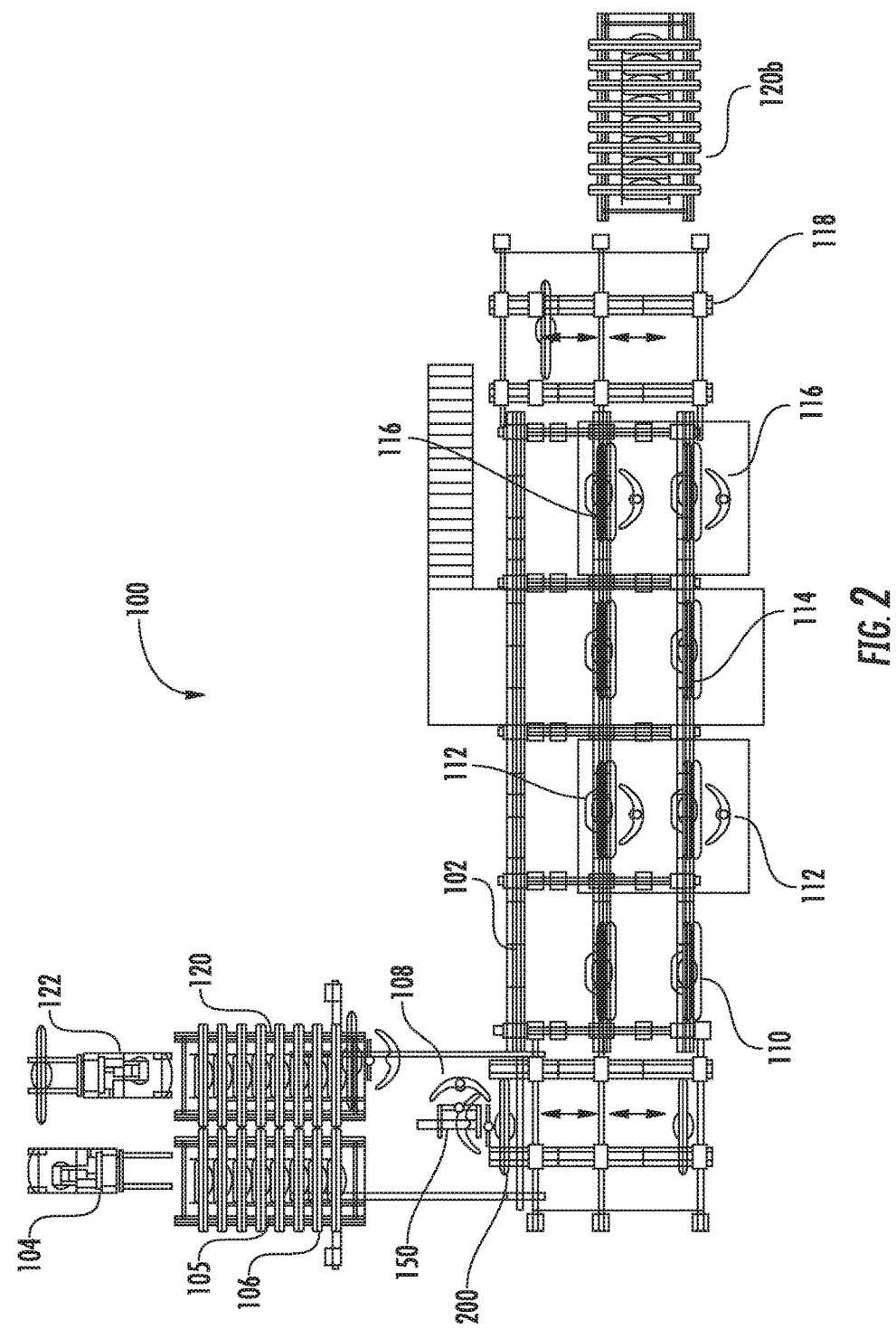
FIG. 2 depicts an overhead view of an example factory layout showing the reconditioning process according to aspects of this disclosure.

FIG. 2 shows an overhead view of a factory layout of the reconditioning process or system 100. The process generally comprises installing a side frame 10 onto a side frame holder 200, engaging or connecting the side frame holder 200 with a conveyer system 102, and moving the side frame holder 200 with the installed side frame 10 along the conveyer system 102 through a plurality of stations. The conveyor system 102 may be an overhead conveyor system or any other suitable system. At each station a specific set of operations may be performed on the side frame 10 to recondition the side frame 10 to meet a set of predetermined specifications including those defined by AAR Specification M-214. The plurality of stations may comprise a first station or preparatory station 108, a second station or pedestal station 112, and a third station or column station 116 as well as a plurality of queue stations 106, 110, 114, 118. Each station 108, 112, 116 may be physically spaced a distance apart sufficient for the queue stations 106, 110, 114, 118 which may hold a side frame holder 200 with a secured side frame 10, to be positioned while waiting for the next station to become available. The process will be discussed in more detail below.

The first step involves a loading area 104 where a side frame 10 may be loaded onto a loading rack 105 using a forklift or other suitable method. The loading rack 105 may be angled such that a first end of the loading rack 105 is at a higher elevation than a second end of the loading rack such that the side frames 10 may gravity feed towards the conveyor system 102. The side frames 10 may then be removed from the loading rack 105 and secured into a side frame holder 200. In some embodiments, the side frames 10 may be moved from the loading rack 105 to the side frame holder 200 using a forklift, a crane or other similar device.

Figure 13:
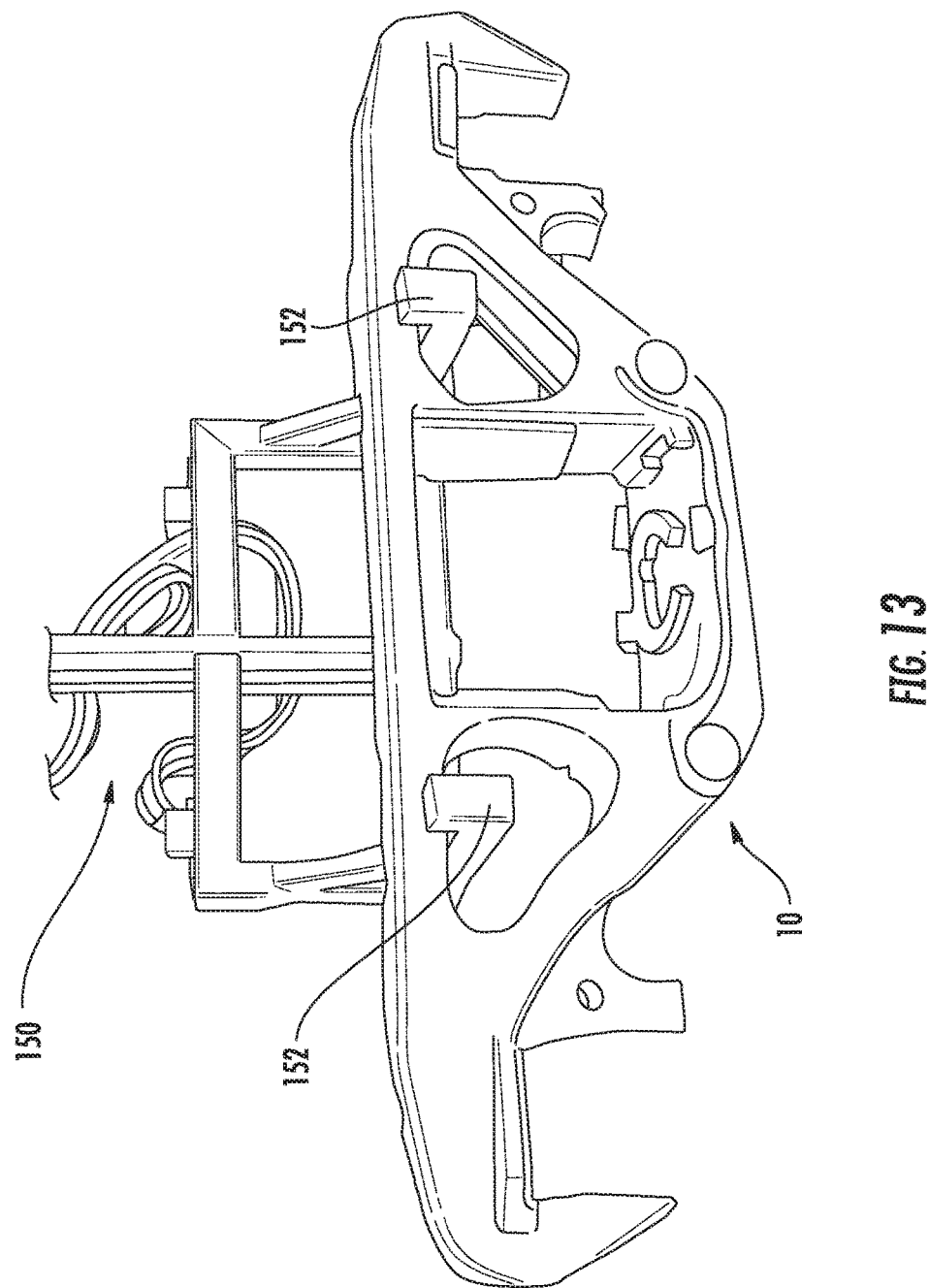
FIG. 13 depicts an exemplary manipulator with a railcar side frame according to aspects of this disclosure.
Figure 14:
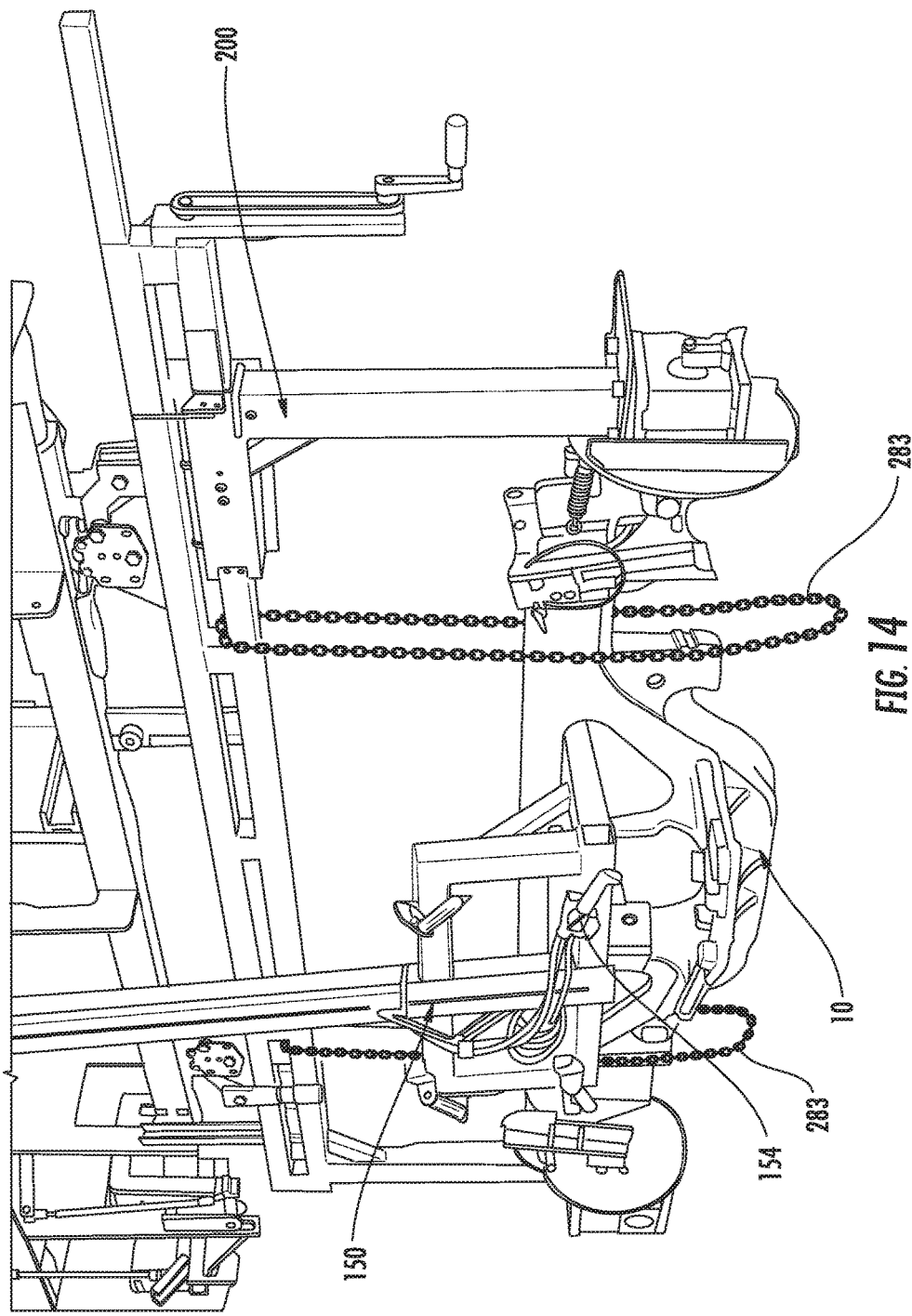
FIG. 14 depicts an exemplary manipulator and an exemplary side frame holder with a railcar side frame according to aspects of this disclosure.

For example, in some embodiments and as shown in FIGS. 13 and 14, the system may include a manipulator 150. The manipulator may include one or more arms 152 configured to engage the side frame 10. The manipulator 150 may be engaged with a hoist (not shown), and the manipulator 150 may include controls 154 allowing an operator to control the movement side frame 10. Thus, an operator may use the manipulator 150 to engage a side frame 10 and move the side frame 10 from the loading rack 105 to the side frame holder 200 and/or from the side frame holder 200 to the unloading rack 120. The side frame holder 200 and installation process will be discussed in more detail below. The loading rack 105 may hold a plurality of side frames 10 in a queue as they are waiting to be reconditioned.

After loading the side frame 10 on the conveyer system 102, the side frame 10 may be moved to the first station or preparatory station 108. (For clarity while describing the process, the side frame 10 may be referred to as moving to the next station along the conveyer system 102. It is understood that once the side frame 10 is secured within the side frame holder 200 the side frame 10 and side frame holder 200 may travel together along the conveyer system 102.) Depending on the condition of the side frame 10, the operator may perform a number of operations at this station including: carbon air gouging, pneumatic grinding, and removing of wear plates, brake beam liners, and other hardware. Additionally, the operator may take measurements to pre-gauge for any new hardware to be added later. The time spent at the preparatory station may be approximately 30 minutes or may range between 15 minutes to 45 minutes. The preparatory station 108 may require less time than the remaining stations, such that a single preparatory station may be needed for every two pedestal stations and two column stations. As shown in FIG. 2, for example, there may be one preparatory station 108 for every two pedestal stations 112, and every two column stations 116.

After completing the work at the preparatory station 108, the side frame 10 may be moved along the conveyor system 102 to queue station 110. Queue station 110 may be used to account for the time variability needed since each side frame 10 may require a different amount of reconditioning work. Thus, the operator working at the preparatory station 108 may begin working on the next side frame 10 even if the operator at the pedestal station 112 is not yet ready for the next available side frame 10.

From the queue station 110, the side frame 10 may be moved along the conveyor system 102 to the pedestal station 112. The operations performed at the pedestal station 112 may include: metal inert gas (MIG) welding to add material to worn down areas and various grinding operations. The operator may use a plurality of gauges and templates to help determine which areas need more or less material. The time spent at the pedestal station may be approximately 60 minutes or may range between 40 minutes to 80 minutes. After the operator has completed the necessary operations, the side frame 10 is moved to another queue station 114 so the next side frame 10 in the queue station 110 may be moved on the overhead conveyor 102 to the pedestal station 112.

Next, the side frame 10 may move along the conveyor system 102 from the queue station 114 to the column station 116. While at the column station 116, the operator may complete the reconditioning process performing operations that may include: MIG welding, various grinding operations, pneumatic or hydraulic impact gun torquing for any new hardware installation. The time spent at the column station 108 may be approximately 60 minutes or may range between 45 minutes to 75 minutes.

Once the operator completes the work at the column station 116, the side frame 10 may be moved along the conveyor 102 to a transition area 118, and then transported to an unloading rack 120. In some embodiments the side frames 10 may be moved from the conveyor system 102 to the unloading rack 120 using a forklift, a crane or other similar device. The unloading rack 120 may be angled such that a first end of the loading rack 120 is at a higher elevation than a second end of the unloading rack such that the side frames 10 may gravity feed away from the conveyor system 102. The side frames 10 may then be unloaded in the unloading area 122 located adjacent to the loading area 104. At the unloading area 122, the side frame 10 may be removed from the side frame holder 200 and the side frame holder 200 may be moved to the adjacent loading area 104 for reuse.

The conveyer system or overhead conveyor system 102, as shown for example in FIG. 2, may be arranged in a continuous loop such that the loading area 104 and unloading area 122 may be located near each other. Advantageously the loading area 104 may be located adjacent the unloading area 122 to allow for the loading/unloading device, such as a forklift, to travel shorter distances and for the side frame holders 200 to travel to the location they will be needed to service the next side frame 10. In other embodiments, the side frames 10 may be unloaded to an unloading rack 120b located adjacent the transition area 118, as shown in FIG. 2.

The system 100 described above may be a manual system wherein operators manually move the side frames 10 between each station, however, in other examples, the system may be automated wherein the side frames 10 automatically move between each station.

Additionally, in some embodiments, sensors may be incorporated into the system which may obtain data related to the reconditioning of each side frame 10. In some embodiments, for example, the time each side frame 10 is at a particular station and the time it takes to recondition a particular side frame 10 may be monitored. In some embodiments still other aspects of the reconditioning process may be monitored. For example, in some embodiments the weight of the side frame may be monitored throughout the process. Additionally, sensors may be incorporated into the system to measure aspects of the side frames throughout the reconditioning process.

Figure 4:
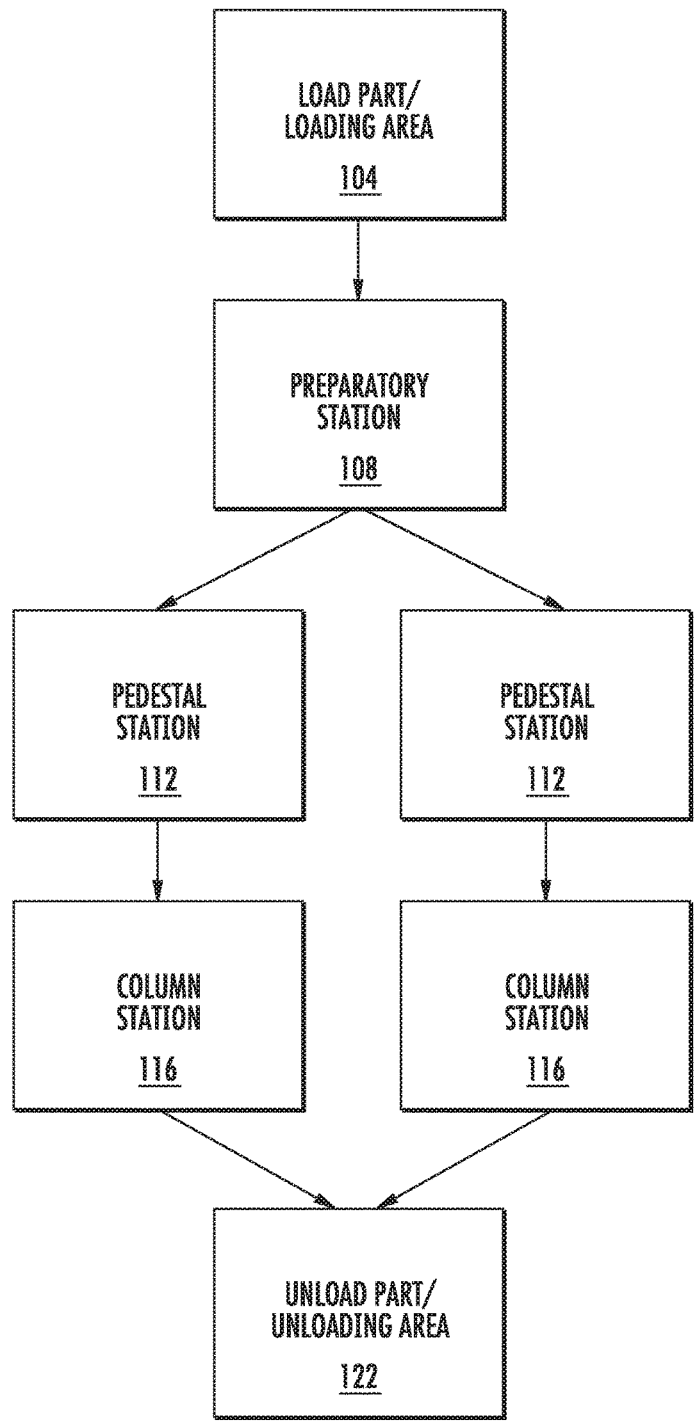
FIG. 4 illustrates a process for reconditioning rail car side frames according to aspects of this disclosure.

FIG. 4 shows a flowchart of the reconditioning process where the part is loaded 104 and moves to preparatory station 108. As described above, the preparatory station 108 may be able to supply parts to at least two pedestal stations 112. After completion of the work at the pedestal station 112, the part is moved to the column station 116, where the reconditioning process is completed. After reconditioning is completed the side frame 10 is unloaded and moves to the unloading area 122.

Figure 3:
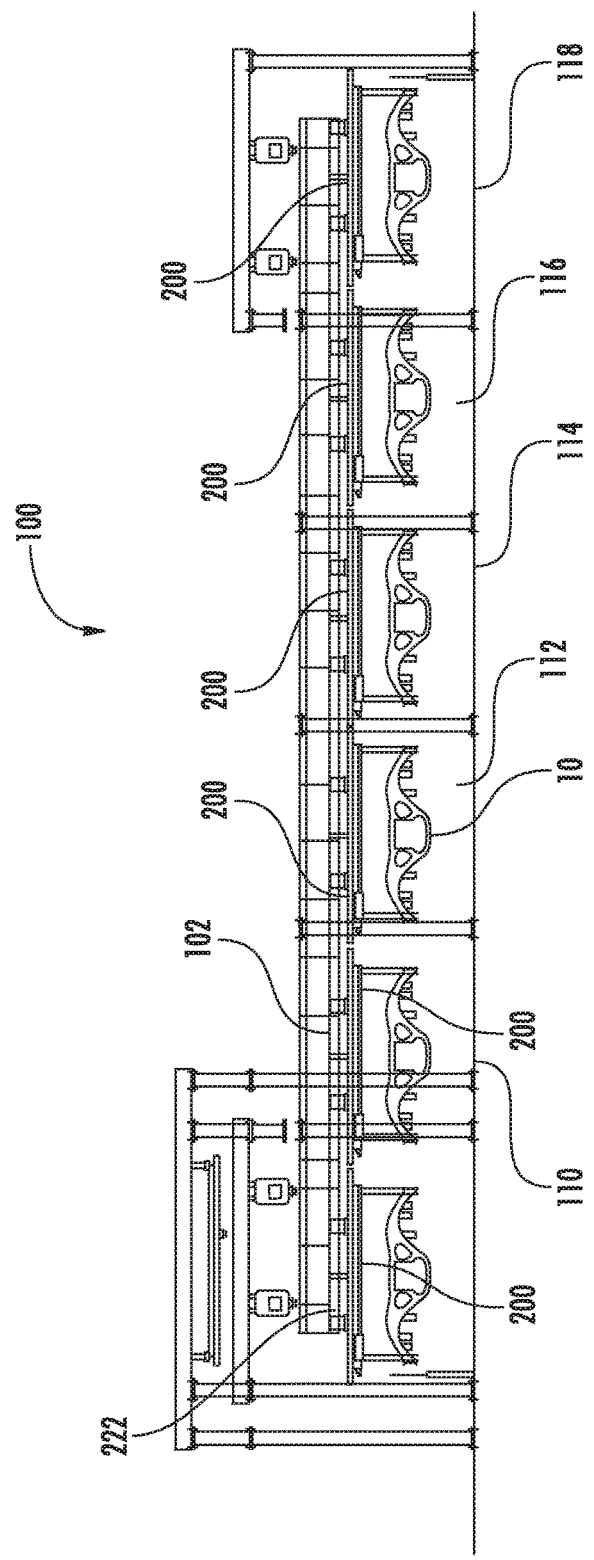
FIG. 3 depicts a side view of the factory layout of FIG. 2.
Figure 5:
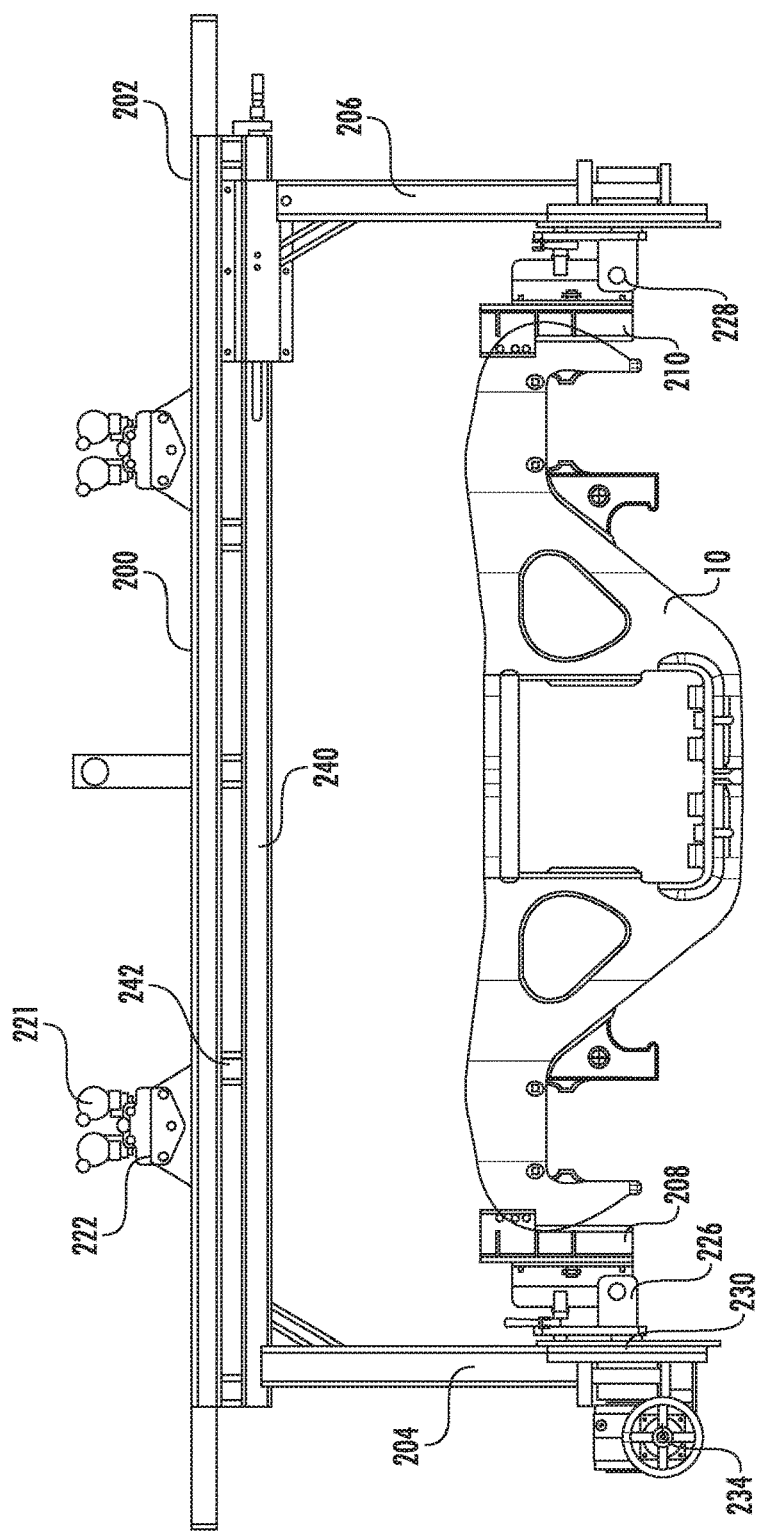
FIG. 5 depicts a front view of an example side frame holder with a railcar side frame according to aspects of this disclosure.

Turning now to the side frame holder 200 in more detail, FIG. 3 shows a side view of the conveyer system 102 along with a plurality of side frame holders 200 each with a side frame 10 installed. The side frame holders 200 are engaged with the conveyer system 102 via a plurality of mounting brackets 222 located at the top of the side frame holder 200. As shown in FIG. 5, the mounting brackets 222 may include one or more rollers 221 or other suitable device to allow the side frame holder 200 to roll or otherwise travel along the conveyor system 102. The side frame holder 200 may hold the side frame 10 such that that the center of gravity of the side frame is about 43 inches above the floor, or about 40 to 46 inches above the floor, or about 35 to 50 inches above the floor to provide an optimal height for the operator to perform the necessary operation(s) on the side frame 10.

Figure 6:
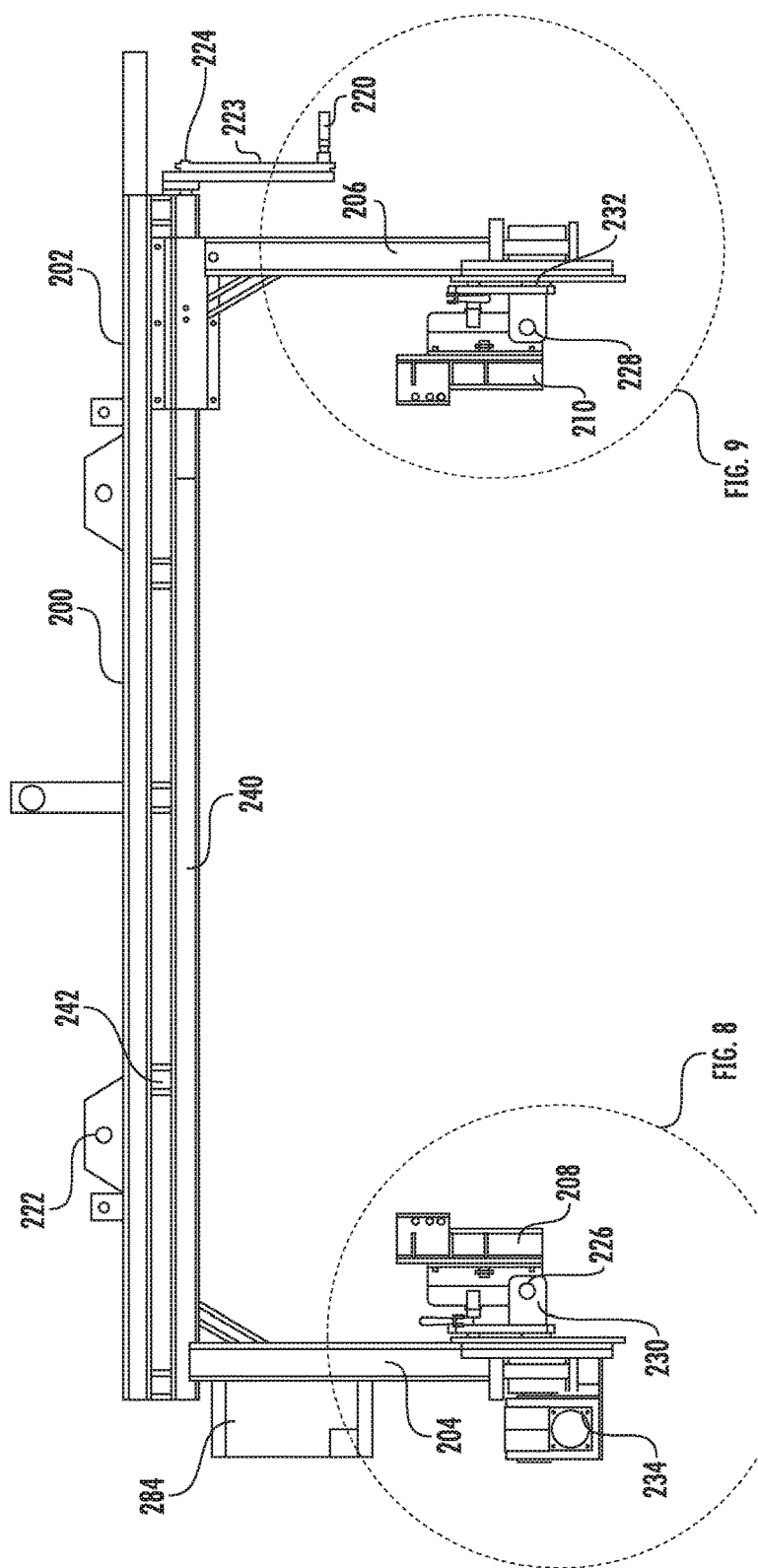
FIG. 6 depicts a front view of an example side frame holder according to aspects of this disclosure.
Figure 7:
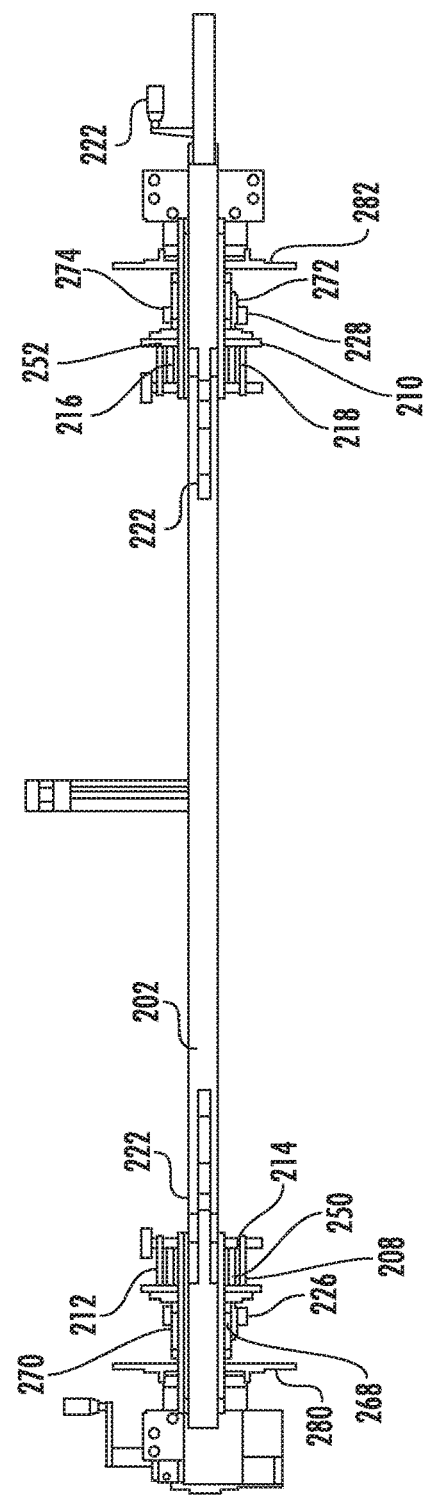
FIG. 7 depicts a top view of the side frame holder of FIG. 6.
Figure 8:
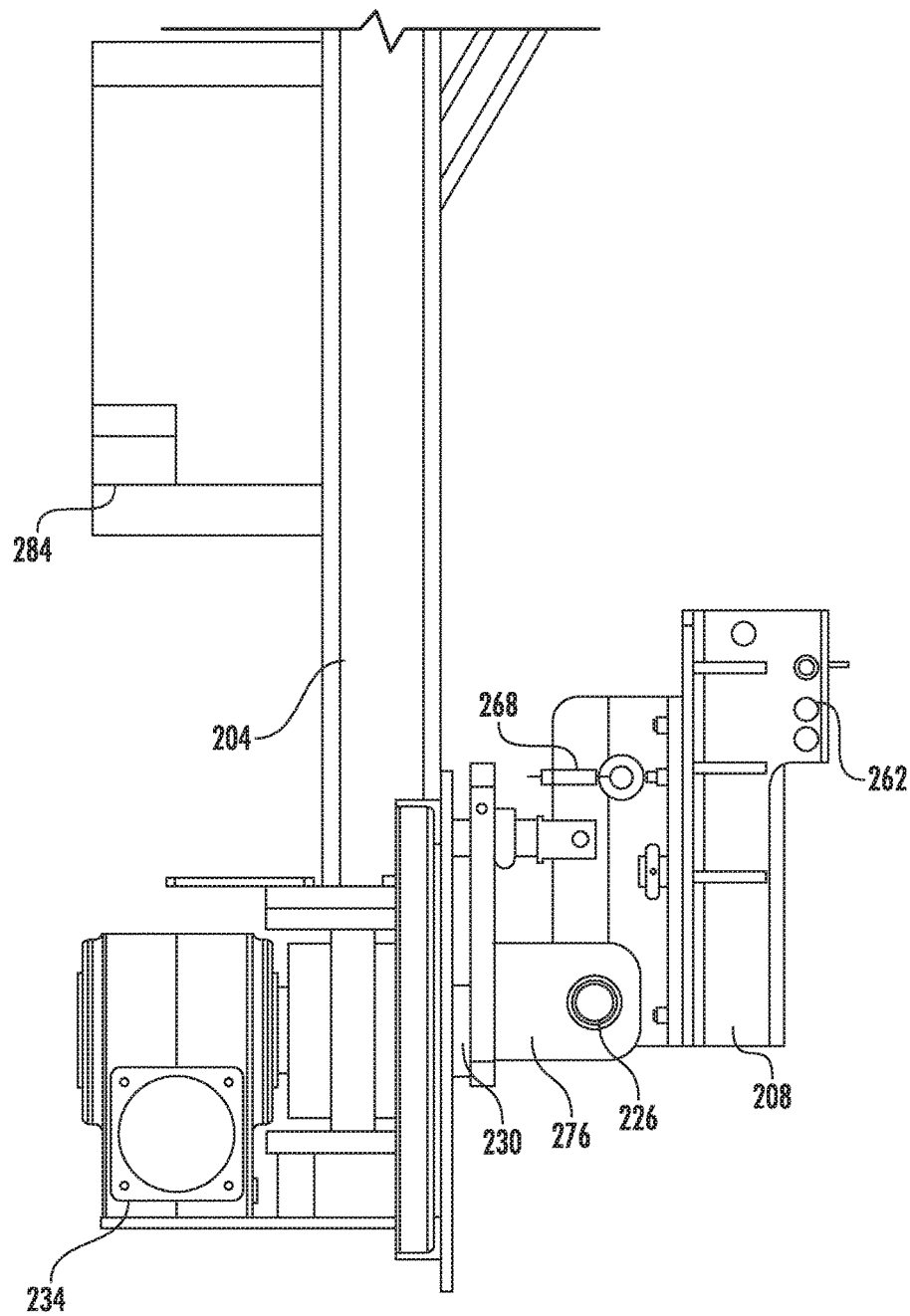
FIG. 8 depicts a detailed view of a portion of the side frame holder of FIG. 6.
Figure 9:
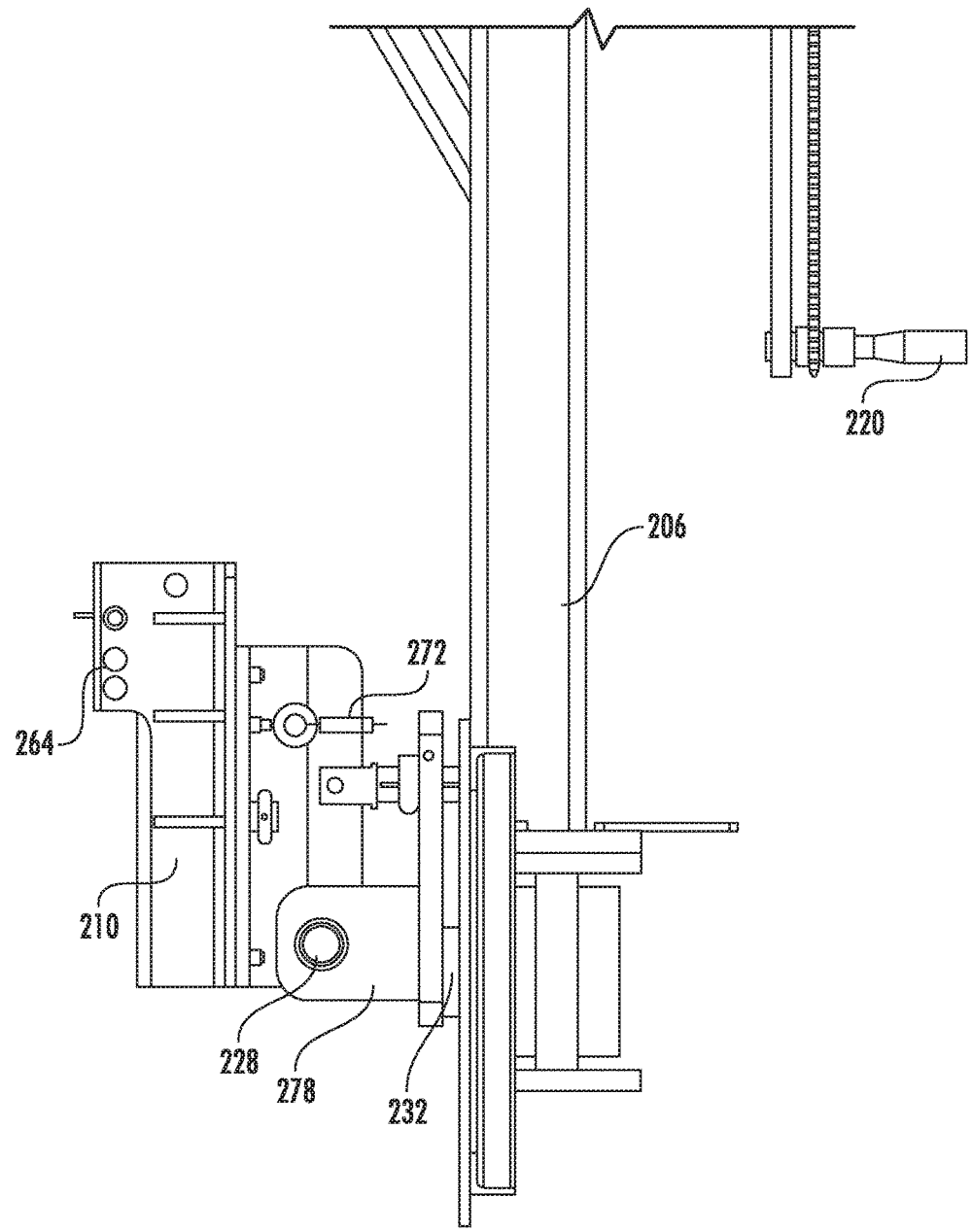
FIG. 9 depicts a detailed view of a portion of the side frame holder of FIG. 6.
Figure 10:
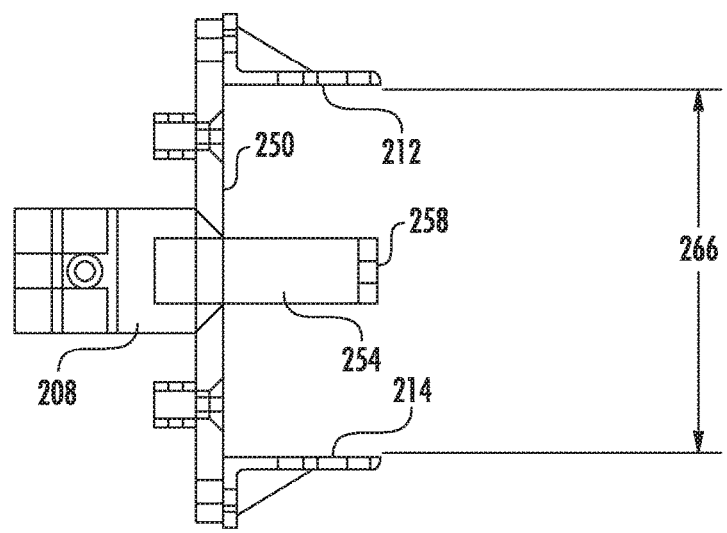
FIG. 10 depicts a top view of a frame guide with the remainder of the side frame holder removed according to aspects of this disclosure.
Figure 11:
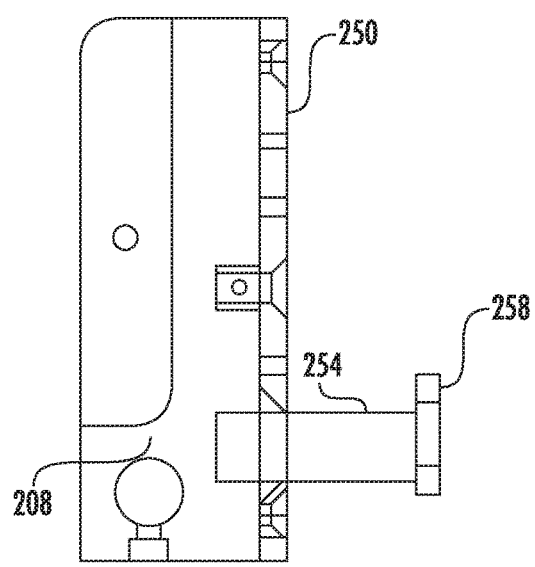
FIG. 11 depicts a side view of the frame guide of FIG. 10 with a portion removed.

FIG. 5 shows the side frame holder 200 with a side frame 10 installed, while FIGS. 6 and 7 show the side frame holder 200 with the side frame 10 removed. The side frame holder 200 may comprise a horizontal base 202, a fixed side arm 204, a movable side arm 206, a first frame guide 208 connected to the fixed side arm 204 and a second frame guide 210 connected to the movable side arm 206. Each frame guide 208, 210 comprise a pair of opposing surfaces 212, 214, 216, 218 spaced a fixed distance apart. The frame guides 208, 210 may be rotatably engaged with their corresponding side arm 204, 206. The side arms 204, 206 are oriented substantially perpendicular to the horizontal base 202. The side frame holder 200 may comprise a plurality of mounting brackets 222 at the top of the horizontal base 202 to connect to the conveyer system 102.

Because there are a variety of sizes of side frames 10, the side frame holder 200 must be adjustable to fit the different sizes of side frames 10 The side frame holder 200 may have a plurality of features to fit the different sizes of the side frames 10. For example, the movable side arm 206 may move along the horizontal base 202 using a hand crank 220 or other suitable adjustment mechanism. Thus, the distance between the side arms 204, 206 may be adjusted by an operator moving the hand crank 220 to move the movable side arm 206 along the horizontal base 202 to either increase or decrease the distance between the side arms. The movable side arm 206 may adjust up to at least 18 inches to accommodate side frames that have wheel based from at least 63 to 72 inches.

The movement of the movable side arm 206 may be controlled by a variety of means such as using gears or screw mechanisms. For example, as shown in the FIGS. 6 and 7, the hand crank 220 is connected to chain 223 connected to a sprocket assembly 224 to move the side arm 206.

As an additional, adjustment feature, each frame guide 208, 210 may be connected to the its respective side arm 204, 206 using a hinge pin 226, 228 to allow each frame guide 208, 210 to rotate inward toward the side frame 10 when it is installed and rotate outward away from the side frame 10 is removed or when not installed. Each hinge pin 226, 228 may be connected to a shaft 230, 232 that connects the frame guides 208, 210 to their respective side arms 204, 206.

Another feature of the frame guides 208, 210 is a plurality of springs 268, 270, 272, 274 that attach to the rear of the mounting surface 250, 252 of the frame guides 208, 210. Each of the springs 268, 270, 272, 274 may be have a first end connected to the frame guides 208, 210 and a second end connected to either one of the side arms 204, 206 or a bracket 280, 282 connected to the side arms 204, 206. The springs act to bias the upper portions of the frame guides 208, 210 outward.

In order to perform all of the necessary operations to recondition the side frame 10, the side frame 10 may be rotated a full 360 degrees about the shafts 230, 232 while secured in the side frame holder 200. As discussed above, each frame guide 204, 206 may be rotatably engaged to each side arm 204, 206 respectively using a shaft 230, 232 that allows each frame guide 204, 206 to rotate within the side frame holder 200. By rotating the side frame 10 within the side frame holder 200, an operator is able to access all necessary areas of the side frame 10 to fully recondition the part. A gearbox 234 may be connected to the shaft 230, which is preferably located on the fixed side arm 204. The gearbox 234 may allow a single operator to rotate the side frame 10 within the side frame holder 200.

The horizontal base 202 of the side frame holder 200 may comprise a plurality of horizontally oriented square steel tubing 240 connected with a plurality of shorter vertically oriented square steel tubing 242 positioned on the end of the square steel tubing 240 and positioned between the ends of the horizontal base 202. The horizontal base 202 may be constructed of steel and welded together. Alternatively, the horizontal base may comprise a single linear piece or square tubing 240. The square tubing may have a cross-sectional size of approximately 3 inches by 3 inches with a 0.25 inch thickness. The overall length of the horizontal base 202 may be approximately 127.5 inches or within a range of 120 inches to 140 inches.

In some embodiments, each side arm 204, 206 may comprise square steel tubing. And in some embodiments, each side arm 204, 206 may have a larger cross-sectional size than the steel tubing of the horizontal base 202. For example, the square tubing may have a cross-sectional size of approximately 4 inches by 4 inches with a 0.25 inch thickness.

As shown in FIG. 8-11 and described above, the frame guides 208, 210 may secure the side frame 10 within the side frame holder 200. The frame guides 208, 210 may each comprise a pair of opposing surfaces 212, 214, 216, 218, a mounting surface 250, 252 adjacent to the opposing surfaces, a pin 254, 256, and a plurality of holes in each opposing surface. Further, the frame guide may be made of a plurality of components that may be welded or bolted together.

The frame guides 208, 210 may each comprise a pair of opposing surfaces 212, 214, 216 (not shown in FIGS. 8-11), 218 (not shown in FIGS. 8-11). The opposing surfaces may be oriented substantially parallel to each other and positioned where surfaces 212, 214 are spaced a fixed distance 266 apart and surfaces 214, 216 are spaced apart the same or similar distance fixed distance 266. The fixed distance 266 may be approximately 6.5 inches or within a range of 6 inches to 7 inches. Additionally, each frame guide may comprise a mounting surface 250, 252 adjacent the opposing surfaces 212, 214, 216, 218 respectively. The mounting surface 250 may be substantially perpendicular to the opposing surfaces 212, 214 and the mounting surface 252 may be substantially perpendicular to the opposing surfaces 216, 218. Each adjacent mounting surface 250, 252 may include a pin 254, 256 that extends from the adjacent surface between the opposing surfaces, such that pin 254 may be positioned between opposing surfaces 212, 214 and pin 256 may be positioned between opposing surfaces 216, 218 respectively. The pins 254, 256 may be made of steel and may have a diameter of approximately 1.5 inches or within a range between 1.0 inches and 2.0 inches. Additionally, each pin 254, 256 may have a protrusion 258, 260 near or at the end of each pin. The pin 254, 256 may extend from the adjacent mounting surface 250, 252 approximately 3.0 inches or within a range of 2.0 and 5.0 inches.

As discussed above, each side frame 208, 210 may include a hinge pin 226, 228. The hinge pins 226, 228 may be oriented in a direction substantially perpendicular to the orientation of the pins 254, 256. The hinge pins 226, 228 may allow the top portions of the frame guides 208, 210 to rotate inward as the side frame 10 is installed. The hinge pins 226, 228 may connect to shafts 230, 232.

Each opposing surface 212, 214, 216, 218 may have a plurality of holes 262, 264. The plurality of holes 262, 264 may comprise a first set of coaxial holes 262 through opposing surfaces 212, 214 and a second set of coaxial holes 264 through opposing surfaces 216, 218. Each set of coaxial holes 262, 264 may comprise any number of holes. For example each set of coaxial holes may comprise 1 hole, 2 holes, 3 holes, 4 holes or at least 5 holes. The holes may have a diameter of 0.78 inches or within a range of 0.50 inches to 1.0 inch.

As mentioned above, each frame guide 208, 210 may be connected to a respective shaft 230, 232 using a hinge pin 226, 228. The plurality of shafts 230, 232 may have a first end having a cylindrical portion and a second end having a clevis 276, 278 with a hole through both surfaces of the clevis 276, 278 for connecting to the hinge pin 226, 228. The shafts 230, 232 may be oriented horizontally within the side frame holder 200 with the first end attached to the side arms 204, 206. The shaft 230 may connect to a gearbox 234 that is attached to the fixed side arm 204. By attaching the shaft 230 to the gearbox 234, a single operator may be able to rotate the side frame 10 around the axis of the shaft 230 a full 360 degrees in order to work on any portion of the side frame 10. Additionally, the shaft 232 may connect to the movable side arm 206 and be arranged where the shaft 230 and shaft 232 are coaxial. The shafts 230, 232 may have a cylindrical portion with a diameter of approximately 3.14 inches or within a range of 2.5 inches to 4.0 inches.

The second end of one or both of the shafts 230, 232 may have an anti-rotation feature to lock the frame guides 208, 210 in a fixed position and keep them from rotating. This anti-rotation feature may comprise a plate connected with the shaft that may have a hole in it to allow for a pin inserted into the hole and into a corresponding hole either on one of the side arms 204, 206 or on a bracket 280, 282 mounted to the side arm.

Figure 12:
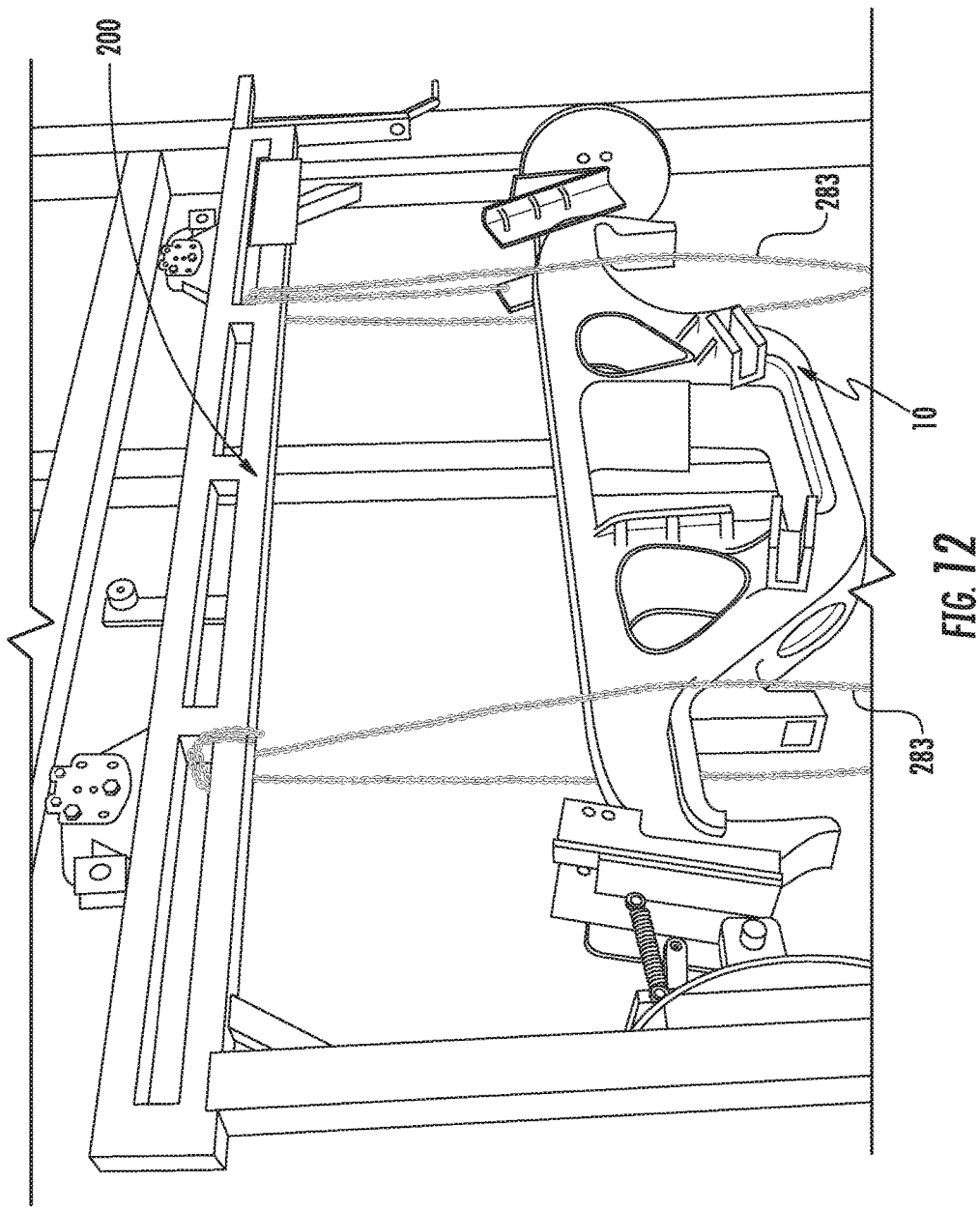
FIG. 12 depicts an exemplary side frame holder with a railcar side frame according to aspects of this disclosure.

The side frame holder 200 may also include one or more secondary fall prevention systems 283 which may act to restrain the side frame 10 if it were to fall from the holder 200. As shown in FIG. 12, the secondary fall prevention system 283 may be chains located at either end of the side frame 10. The chains shown in FIG. 12 are connected to the holder 200 and are configured to restrain the side frame 10 from hitting the ground if it were to fall from the holder 200.

Additionally, a container 284 may be connected to the fixed side arm 206 or onto the movable side arm 206 to hold the any instructions or material needed for the reconditioning process. Alternatively, a container may be connected to both of the side arms 204, 206.

To install the side frame 10 into the side frame holder 200, the side frame 10 may be raised above the frame guides 208, 210 using a crane, forklift or other device. Next, the side frame 10 may be positioned such that the side frame 10 is between the opposing surfaces 212, 214 of frame guide 208 and opposing surfaces 216, 218 of frame guide 210. If necessary, the movable side arm 204 may be adjusted to the proper length to match the side frame 10. The side frame 10 may then be lowered between the frame guides 208, 210 until the side frame 10 contacts the pins 254, 256 on either side of the side frame 10. As the side frame 10 is lowered the frame guides 208, 210 may rotate about their respective hinge pins 226, 228 until the adjacent mounting surface 250, 252 contact the ends of the side frame 10. Lastly, a pin may be place through the appropriate hole 262, 264 to secure the side frame 10 to the frame guides 208, 210 within the side frame holder 200 allowing it to be rotated within the side frame holder 200.

Accordingly, it will be understood that the invention is not to be limited to the embodiments disclosed herein, but is to be understood from the following claims, which are to be interpreted as broadly as allowed under the law.

What is claimed is:

1. A system for reconditioning a side frame of a railcar comprising:
    an overhead conveyer; and
    a side frame holder, the side frame holder comprising:
        a first side arm;
        a second side arm, the second side arm being movable relative to the first side arm;
        a first frame guide and a second frame guide, each frame guide comprising a mounting surface;
    wherein a railcar side frame is secured in the side frame holder; and
    wherein the side frame holder is movably engaged with the overhead conveyer; and
    wherein the mounting surface of the first frame guide is configured to engage a front edge of the railcar sideframe and wherein the mounting surface of the second frame guide is configured to engage a back edge of the railcar sideframe.

2. The system for reconditioning a side frame of a railcar of claim 1, wherein the side frame holder comprises a fixed side arm and a movable side arm.

3. The system for reconditioning a side frame of a railcar of claim 1, wherein the overhead conveyer forms a continuous loop.

4. The system for reconditioning a side frame of a railcar of claim 1, wherein the side frame holder further comprises a pair of frame guides, each frame guide having pair of opposing surfaces, and wherein the side frame is secured within the frame guides.

5. The system of reconditioning a side frame of a railcar of claim 1, wherein the side frame is able to be rotated 360 degrees while secured within the side frame holder.

6. A system of reconditioning a side frame of a railcar:
    an overhead conveyer; and
    a side frame holder, the side frame holder comprising:
        a first side arm;
        a second side arm, the second side arm being movable relative to the first side arm;
        a first frame guide and a second frame guide, each frame guide comprising a pair of opposing surfaces spaced a fixed distance apart and a mounting surface adjoining the opposing surfaces;
    wherein the side frame holder is configured to secure a side frame;
    wherein the side frame holder is movably engaged with the overhead conveyer;
    wherein each opposing surface has a plurality of holes through each of the opposing surfaces; and
    wherein the plurality of holes on the opposing surfaces of the first frame guide are coaxial and the plurality of holes on the opposing surfaces of the second frame guide are coaxial.

7. The system for reconditioning a side frame of a railcar of claim 6, wherein the first frame guide is rotatably engaged with the first side arm and the second frame guide is rotatably engaged with the second side arm.

8. The system for reconditioning a side frame of a railcar of claim 6, further comprising a first shaft connecting the first frame guide to the fixed side arm and a second shaft connecting the second frame guide to the movable side arm; wherein the first shaft is connected to the first frame guide using a hinge pin and wherein the second shaft is connected to the second frame guide using a hinge pin.

9. The system for reconditioning a side frame of a railcar of claim 8, wherein the first shaft is connected to a gearbox.

10. The system for reconditioning a side frame of a railcar of claim 6, wherein each frame guide further comprises a pin extending from the mounting surface and located between the opposing surfaces.

11. The system for reconditioning a side frame of a railcar of claim 6, wherein the fixed distance of the opposing surfaces is within a range of 6 inches to 7 inches.

12. The system for reconditioning a side frame of a railcar of claim 6, wherein the structure further comprises a container connected to the fixed side arm.

\* \* \* \* \*